United States Patent Office 3,509,393
Patented Apr. 28, 1970

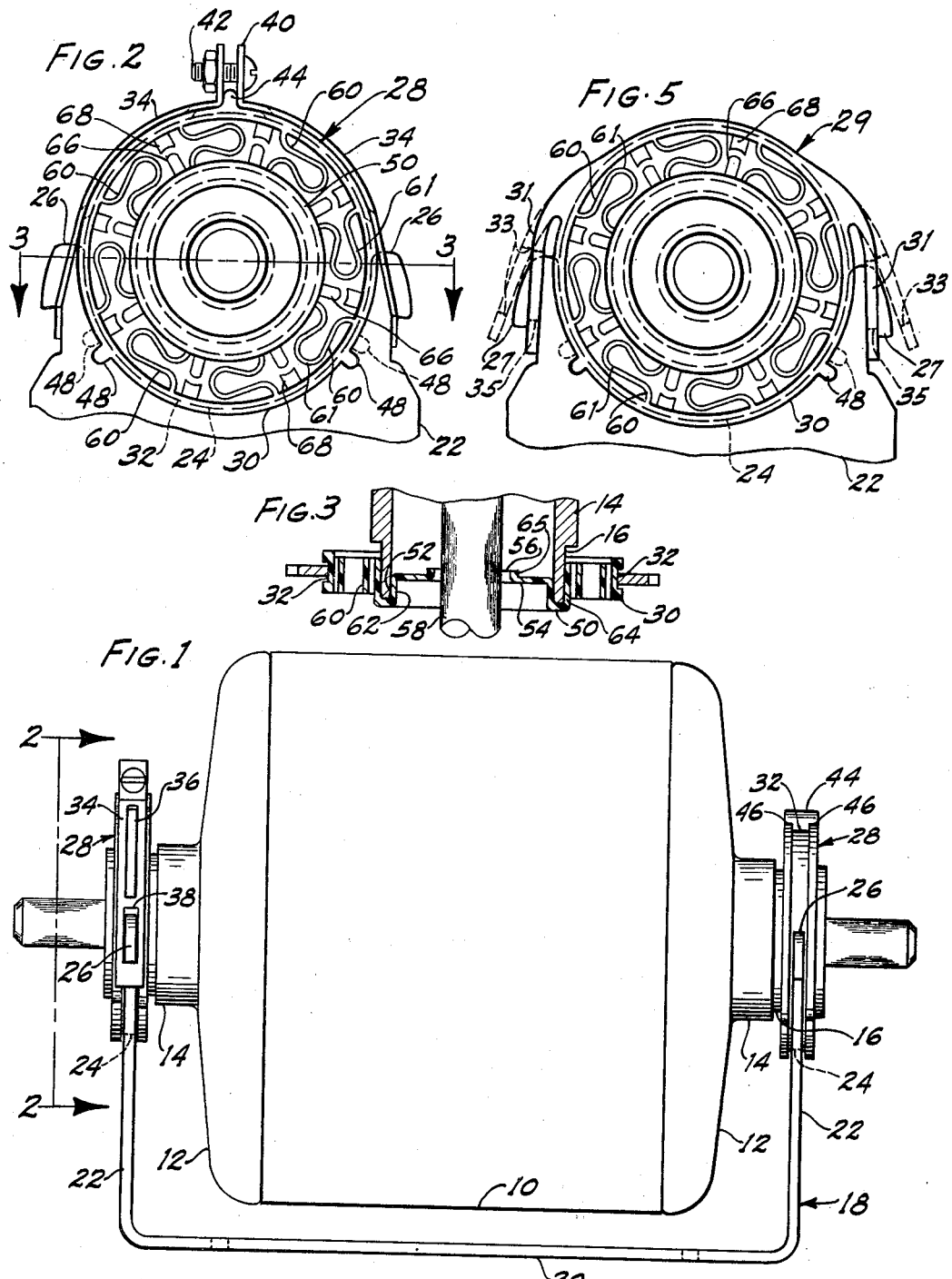

3,509,393
ELECTRIC MOTOR HAVING RESILIENT MOUNTING RING WITH BEARING CAP
Joseph T. Roddy, Ballwin, Mo., assignor to Emerson Electric Co., St. Louis, Mo., a corporation of Missouri
Filed May 7, 1968, Ser. No. 727,202
Int. Cl. H02k 5/24
U.S. Cl. 310—51                              8 Claims

ABSTRACT OF THE DISCLOSURE

A shock absorbing motor mounting ring with integral bearing cap formed as a casting of synthetic thermoplastic material comprising an outer rim portion for connection to fixed support means and a central hub portion connected to the rim portion by circularly arranged resilient members, the hub portion having a deep annular groove in one face thereof and being adapted to be press fitted on the end portion of a hollow cylindrical motor end shield boss and the hub portion including a centrally perforated end wall to retain bearing lubricant.

---

The invention relates to mounting means for electric motors and particularly to the provision of a shock absorbing motor mounting ring and bearing cap formed as an integral unit.

It has been customary in the construction of shock absorbing motor mounting rings to construct the outer rim and central hub portion of metal and to bond these members as inserts in a casting of rubber-like material forming a resilient annular web portion connecting the rim and hub portions. It has also been customary to press the hub portion over a projecting hollow cylindrical boss projecting from a motor end shield and to form a lubrication retaining bearing cap as a separate metal cup-like stamping to be press fitted into the end of the hollow, cylindrical end shield boss.

The present invention has for an object the provision of a unitary motor mounting ring and bearing cap formed as a casting of homogenous material and having a relatively rigid mounting rim portion and a relatively rigid hub portion connected by relatively resilient, circularly arranged members, thereby to substantially damp the transmission of shock forces between the rim and hub portions.

A further object is to provide a motor mounting ring, as described in the preceding paragraph, constructed of a material which is particularly effective in damping higher frequency vibrations.

A further object is to provide a shock absorbing motor mounting ring formed as a casting of thermoplastic material in which the resiliency of the mounting ring is varied in accordance with the conditions of use by the addition to the thermoplastic material of various quantities of relatively high tensile strength fibres.

A further object is to provide as an integral casting of suitably resilient material a shock absorbing motor mounting ring having a peripherally grooved rim portion adapted to be embraced by and connected to the concave arcuate end of a fixed support member, a hub portion for connection to the motor, circularly arranged members of predetermined resiliency connecting the rim and hub portions and integral flexible members on the rim portion adapted to detachably engage cooperating means on the fixed support member, thereby to securely connect the mounting ring to the fixed support member.

Further objects and advantages will appear from the following description when read in connection with the accompanying drawing.

In the drawing:

FIG. 1 is a side elevational view of an electric motor connected at its ends to support means by motor mounting rings constructed in accordance with the present invention;

FIG. 2 is an end elevational view of a motor mounting ring shown in FIG. 1 looking along line 2—2 of FIG. 1;

FIG. 3 is a cross-sectional view of the motor mounting ring shown in FIG. 2 taken along line 3—3 of FIG. 2;

FIG. 4 is a top side elevational view of the motor mounting rings shown in FIG. 1; and FIG. 5 is an end elevational view of a second form of motor mounting ring constructed in accordance with the present invention having integrally formed means for detachable connection of the mounting ring to support means.

Referring to FIG. 1 of the drawing, an electric motor is generally indicated at 10 having end shields 12 provided with central, hollow, cylindrical projecting bosses 14, the outer end portions 16 of which are of reduced diameter. The motor 10 is shown supported on a sheet metal bracket 18 of U-shaped form having a horizontal base portion 20 and upstanding legs 22. The legs have concave, arcuate, and substantially semicircular upper end portions 24 with hook portions 26 formed at each end of the arcuate portion.

Each end of the motor 10 is provided with a mounting ring generally indicated at 28. Referring to FIG. 2, each of the mounting rings 28 has an outer circular rim portion 30 provided with a peripheral groove 32, the lower half of which receives a concave, semicircular upper end portion of a leg 22. Overlying the upper half of the rim portion 30 of the mounting ring are a pair of arcuate attaching bands 34. The bands 34 are somewhat wider than the peripheral groove 32 and each of the bands is provided with a longitudinally extending, inwardly formed extrusion 36 which enters the groove 32 to retain the band against lateral displacement. Near their lower ends each of the arcuate attaching bands 34 is provided with an elongated rectangular perforation 38 which receives a hook portion 26. At their upper ends the arcuate attaching bands are formed radially outward at 40 and are perforated to receive a clamping bolt 42.

The outer rim portion 30 of the mounting ring 28 is also provided with lugs 44 projecting radially from the flange portions 46 formed by the peripheral groove 32. The lugs 44 are positioned between the radially formed end portions 40 of the attaching bands and prevent rotation of the mounting ring 28 on the support bracket 22. The outer rim portion 30 is further provided with two pairs of lugs 48 also extending radially from the flange portions 46. The lugs of each pair lie on opposite sides of the bracket legs 22 and provide further assurance that the mounting ring will not be displaced axially.

The mounting ring 28 is further provided with a central circular hub portion 50 having a relatively deep, circular groove 52 entering from the inner face thereof which receives in press fit relationship the reduced diameter end portion 16 of the hollow cylindrical boss 14 projecting from the motor end shield, see FIG. 3. The hub portion 50 further includes a closure wall 54 having a central perforation 56 to permit free passage therethrough of a projecting motor shaft 58.

The hub portion 50 is connected to the rim portion 30 by a plurality of elongated, circularly arranged, resilient connecting members 60. The connecting members 60 are flat strips of rectangular cross-sectional configuration connected at their ends to the hub portion 50 and rim portion 30 at points thereon in substantial radial alignment and have a considerable portion of their length formed as loops 61 expending generally transversely to the radial line joining their connected ends. The reasons for forming the connecting members with the laterally extending loops 61, as shown, instead of making them straight between their connected ends are to permit relative radial movement of the rim and hub portions and to permit the use of longer connecting members in the space available. Dimensional and material control in attaining the desired resiliency of the longer looped connecting members is less critical, and their natural frequency being lower than shorter straight members, they inherently reduce transmission of higher frequency vibrations between the motor and support. Moreover, the transverse loop portions of connectors 60 absorb shock forces acting radially between the motor and connecting rim portion 30 as well as torsional.

The closure wall 54 of the hub portion 50 is recessed with respect to its outer face and the portion of the wall 54 surrounding the central aperture 54 is formed inward at a right angle to form an inwardly projecting annular lip 65. The width of the deep annular groove 52 is such as to result in a tight press fit on the end portion 16 of the end shield boss 14 which will secure the mounting ring against rotational or axial slippage in use. Under certain conditions of use it may be desirable or necessary to provide integrally formed driving keys on the wall of the groove 52 and cooperating axial grooves in the portion 16 of the end shield boss to insure against rotational slippage. Also, under certain conditions, it may be necessary to provide an annular bead formed integrally on the wall of the groove cooperating with an annular groove in the portion 16 of the boss to insure against axial movement. Both of these expedients may be employed and the use of such expedients when necessary is contemplated.

The motor mounting ring 28 is formed as a unitary casting, preferably of a synthetic thermoplastic material such as nylon, to which fibres of relatively high tensile strength and elasticity, such as glass fibres, are added in accordance with use requirements. That is to say, when the mounting rings are used to mount relatively heavy motors or motors with relatively high starting torque, a greater percentage of high tensile strength fibres are added than when the motors to be mounted are relatively light or have relatively low starting torque.

The relatively low elasticity or slow recovery rate of many synthetic thermoplastic materials, such as nylon, render them effective in damping transmission of higher frequency vibrations, but they are subject to cold flow or permanent distortion under stresses of sufficient magnitude. The addition of high tensile strength elastic fibres permits greater stressing without permanent distortion while yet preserving in substantial part the ability of the material to absorb higher frequency vibrations. It is to be understood, however, that the mounting ring 28 may be formed as a unitary casting of any material suitable for the purpose, without the addition of any filler to modify its elasticity or strength, without departing from the spirit of the present invention.

The motor mounting ring 28 is further preferably provided with shock bumpers comprising the elements 66 extending radially outward from the hub portion 50 which cooperates with the elements 68 extending radially inward from the rim portion 30 in alignment with elements 66. The space between the adjacent ends of elements 66 and 68 is such that under the dead load of a motor or under any stresses incident to the normal operation thereof the ends do not touch. The purpose of the bumper elements 66 and 68 is to prevent overstressing and breaking of the connecting members 60 as may occur if a motor with the mounting rings 28 attached is inadvertently or carelessly dropped into the arcuate saddles 24 at the upper ends of bracket legs 22 or is dropped to the floor. The elements 66 and 68 are circularly arranged and are of sufficient number so that one or more of the elements will be effective to limit the flexing of connecting elements 60 regardless of which portion of the periphery of the rim 30 receives an abnormal impact force. The ends of the elements 66 are rounded convex and the ends of the somewhat wider elements 68 are concave. This prevents the end of element 66 from slipping off of element 68 if the abnormal impact force is applied in a direction other than in radial alignment with these elements.

FIG. 5 shows a modified form 29 of the motor mounting ring in which integrally formed flexible attaching straps 31 having slotted openings 33 near the free ends thereof to receive hook portions 27 on legs 22 are provided. The attaching straps 31 are shown in solid line in an operative position on hook portions 27 and are also shown in dotted line in a free position prior to engagement with hooks 27. The hook portions 27 on the support legs 22 are formed with a notch 35 to insure retention of attaching straps 31. The provision of the integrally formed attaching straps 31 in the modification shown in FIG. 5 effects further economy of construction and assembly by the elimination of attaching bands 34 and bolt 42 used with the motor mounting rings shown in FIG. 2. The motor mounting ring of FIG. 5 is otherwise similar to the mounting ring of FIG. 2.

I claim:

1. A motor mounting ring for electric motors formed as an integral casting of synthetic thermoplastic material and comprising an outer rim portion adapted to be embraced by and connected to support means, a central hub portion adapted to be connected to a motor end shield, and a plurality of circularly arranged elongated members connecting said rim and hub portions and having such form as to be sufficiently resilient to substantially damp the transmission of torsional and radial vibrations between a motor and its support means, and said central hub portion including an integrally formed centrally perforated end wall forming a bearing cap.

2. A motor mounting ring for electric motors formed as an integral casting of synthetic thermoplastic material and comprising an outer rim portion adapted to be embraced by and connected to support means, a central hub portion adapted to be connected to a motor end shield, and a plurality of circularly arranged elongated members connecting said rim and hub portions and having such form as to be sufficiently resilient to substantially damp the transmission of torsional and radial vibrations between a motor and its support means, and a plurality of integrally formed and circularly arranged and aligned pairs of bumper elements extending radially inward and radially outward, respectively, from said outer rim portion and said central hub portion, the free ends of which bumper elements are normally in radial spaced relationship and which free ends engage to limit the radial flexure of said connecting elements.

3. A motor mounting ring as set forth in claim 2 in which the free ends of said bumper elements are configured to preclude lateral slippage.

4. In combination, a motor mounting ring for electric motors formed as an integral casting of synthetic thermoplastic material and comprising an outer rim portion, a central concentric hub portion and a plurality of circularly arranged resilient members connecting said rim and hub portions, support means including a flat upstanding leg having an concave semicircular portion at its upper end, said outer rim portion having a peripheral groove and an axially spaced flange on each side of said groove, said groove receiving said concave upper end portion of said support leg, means securely connecting said rim portion to said support leg and said rim portion including integrally formed lugs projecting radially from each of said flanges and on opposite sides of said support leg thereby to further insure against axial movement of the mounting ring on said support portion.

5. An arrangement as set forth in claim 4 in which a pair of hook members are formed on said support leg at its upper end, one at each side of said concave upper end portion, and said rim portion of said mounting ring including a pair of integrally formed flexible attaching straps extending downward from the upper half of the periphery of said rim portion and having perforations near the lower ends thereof to receive said hook members.

6. In combination with a motor having a central hollow cylindrical end shield boss extending axially outward, a motor mounting ring formed as an integral casting of synthetic thermoplastic material and comprising an outer rim portion adapted to be connected to motor support means, a central hub portion and a plurality of circularly arranged resilient members connecting said hub and rim portions, and said hub portion being formed with a deep annular groove in one face thereof receiving in press fit relationship the end portion of said hollow cylindrical boss thereby to secure said hub portion to said motor.

7. The arrangement set forth in claim 6 in which fibres of relatively high tensile strength and elasticity are added to the thermoplastic material of which said mounting ring is constructed thereby to provide the required elasticity of the walls defining said deep annular groove to preclude relaxing of the press fit due to cold flow.

8. The arrangement set forth in claim 6 in which said central hub portion includes an end wall forming a bearing cap.

References Cited

UNITED STATES PATENTS

| | | | |
|---|---|---|---|
| 2,112,473 | 3/1938 | Tolerton | 179—115.5 |
| 2,803,416 | 8/1957 | Berlien | 248—26 |
| 2,936,141 | 5/1960 | Rapata | 248—26 |
| 3,065,941 | 11/1962 | Loftis | 248—26 |
| 3,235,207 | 2/1966 | Church | 248—26 |
| 3,242,358 | 3/1966 | Balke et al. | 310—45 |
| 3,317,166 | 5/1967 | Janssen | 248—26 |
| 3,323,763 | 6/1967 | Butts | 248—15 |
| 3,394,908 | 7/1968 | Irvin | 248—26 |

WARREN E. RAY, Primary Examiner

U.S. Cl. X.R.
248—26; 310—91